(12) United States Patent
Litwin, Jr.

(10) Patent No.: US 6,795,486 B2
(45) Date of Patent: Sep. 21, 2004

(54) VARIABLE-LENGTH CORRELATOR FOR SPREAD-SPECTRUM COMMUNICATIONS

(75) Inventor: Louis Robert Litwin, Jr., Plainsboro, NJ (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 58 days.

(21) Appl. No.: 10/252,573

(22) Filed: Sep. 23, 2002

(65) Prior Publication Data

US 2004/0057498 A1 Mar. 25, 2004

(51) Int. Cl.⁷ .................................................. H04B 1/69
(52) U.S. Cl. ...................................................... 375/142
(58) Field of Search ................................. 375/142, 149, 375/150, 130, 152, 316; 708/403

(56) References Cited

U.S. PATENT DOCUMENTS

| | | | |
|---|---|---|---|
| 4,926,440 A | 5/1990 | Mikoshiba et al. | 375/145 |
| 5,216,691 A | 6/1993 | Kaufmann | 375/150 |
| 5,894,494 A | 4/1999 | Davidovici | 375/150 |
| 6,256,337 B1 | 7/2001 | Hendrickson et al. | 375/140 |
| 6,351,293 B1 * | 2/2002 | Perlow | 348/726 |
| 6,359,944 B1 * | 3/2002 | Curtis et al. | 375/344 |
| 6,370,160 B1 * | 4/2002 | Knutson et al. | 370/503 |
| 6,377,615 B1 * | 4/2002 | Sourour et al. | 375/150 |
| 6,621,857 B1 * | 9/2003 | Belotserkovsky et al. | 375/149 |
| 6,704,374 B1 * | 3/2004 | Belotserkovsky et al. | 375/326 |

* cited by examiner

Primary Examiner—Khai Tran
(74) Attorney, Agent, or Firm—Joseph S. Tripoli; Harvey D. Fried; Joseph J. Kolodka

(57) ABSTRACT

An apparatus and method for providing variable-length correlation for spread-spectrum communications includes a derotator, a variable-length correlator in signal communication with the derotator, a phase detector in signal communication with the variable-length correlator, a lock detector in signal communication with the phase detector, and a controller in signal communication with the lock detector for controlling the length of the variable-length correlator; where the corresponding method to track out large frequency offsets in spread-spectrum communications includes receiving signal chips, correlating the received signal chips, computing a loop error in accordance with the correlation, setting a new lock status in accordance with the computed loop error and a previous lock status, and setting a new correlator length in accordance with the new lock status and a previous correlator length.

18 Claims, 6 Drawing Sheets

VARIABLE-LENGTH CORRELATOR FOR SPREAD-SPECTRUM COMMUNICATIONS

BACKGROUND

The present disclosure relates to spread-spectrum communications and, in particular, to a system and method for providing a variable-length correlator for spread-spectrum communications.

In typical communications systems, frequency offsets are removed from the signal using a carrier recovery loop. In typical spread-spectrum systems, the signal or error is derived from the output of a fixed-length correlator that correlates the received signal (i.e., the received frequency chips) against the known spreading sequence. Unfortunately, the removal of large frequency offsets using a fixed-length correlator has drawbacks and disadvantages.

For example, in one application the common pilot channel ("CPICH") pilot signal in wideband code division multiple access ("WCDMA") is spread with a spreading code of length 256 and, based on the accuracy of inexpensive oscillators readily available on the market, a frequency offset of up to 10 kHz is to be tracked out. Based on existing techniques in the prior art, the correlator would have a length of the full 256 chips. However, such a loop cannot track out a 10 kHz offset with such a large delay in the loop.

One potential solution is to use a more accurate oscillator, but these parts can be very expensive so it is desirable to use a less accurate part and provide a novel way to remove the larger resulting offset.

Another potential solution is to try to converge with a fixed length 256 correlator. If that doesn't converge after a given amount of time, the frequency of a numerically controlled oscillator ("NCO") can be stepped up and the loop can try to converge again. This process might be repeated until the NCO's frequency is stepped close enough to the actual frequency offset so that the loop can track out the remaining offset. However, this solution can be time-consuming, as the receiver has to try a large number of offsets for the NCO. In addition, such a loop will have difficulty tracking any sudden large changes in the frequency offset.

SUMMARY

These and other drawbacks and disadvantages of the prior art are addressed by an apparatus and method for providing a variable-length correlator for spread-spectrum communications. The apparatus includes a derotator, a variable-length correlator in signal communication with the derotator, a phase detector in signal communication with the variable-length correlator, a lock detector in signal communication with the phase detector, and a controller in signal communication with the lock detector for controlling the length of the variable-length correlator.

The corresponding method to track out large frequency offsets in spread-spectrum communications includes receiving signal chips, correlating the received signal chips, computing a loop error in accordance with the correlation, setting a new lock status in accordance with the computed loop error and a previous lock status, and setting a new correlator length in accordance with the new lock status and a previous correlator length.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for providing a variable-length correlator for spread-spectrum communications in accordance with the following exemplary figures, in which.

DETAILED DESCRIPTION OF PREFERRED EMBODIMENTS

The present disclosure relates to spread-spectrum communications and, in particular, to a system and method for providing a variable-length correlator for spread-spectrum communications. Embodiments of the present disclosure include hand-held cellular devices usable in spread-spectrum communications systems.

Figure 1:
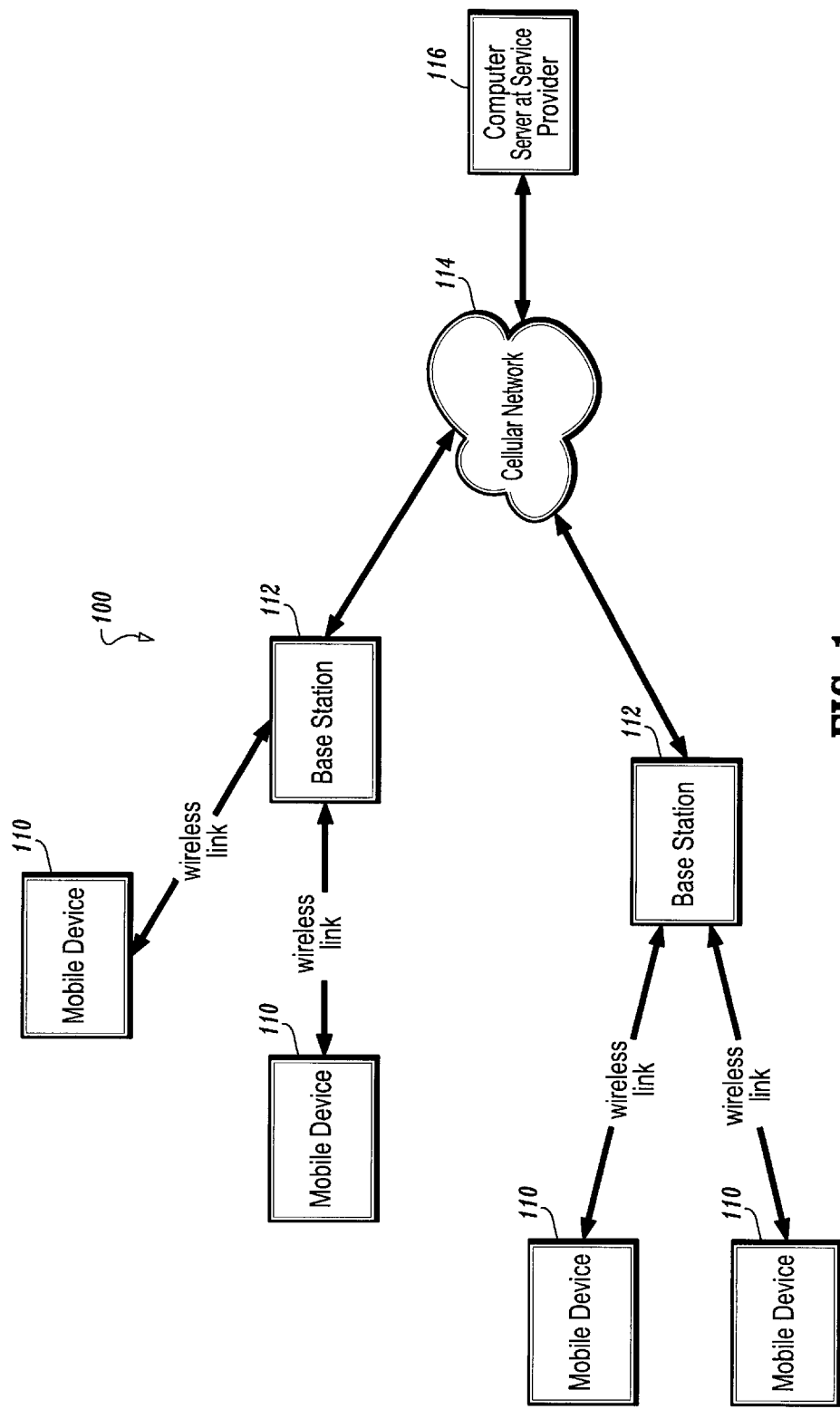
FIG. 1 shows a block diagram for a spread-spectrum communications system according to an illustrative embodiment of the present disclosure.

As shown in FIG. 1, a spread-spectrum communications system 100 includes spread-spectrum communications devices 110, such as, for example, mobile cellular telephone embodiments. The communications devices 110 are each connected in signal communication to a base station 112 via spread-spectrum wireless links. Each base station 112, in turn, is connected in signal communication with a cellular network 114. A computer server 116, such as, for example, a server residing with a cellular service provider, is connected in signal communication with the cellular network 114. Thus, a communications path is formed between each cellular communications device 110 and the computer server 116.

Figure 2:
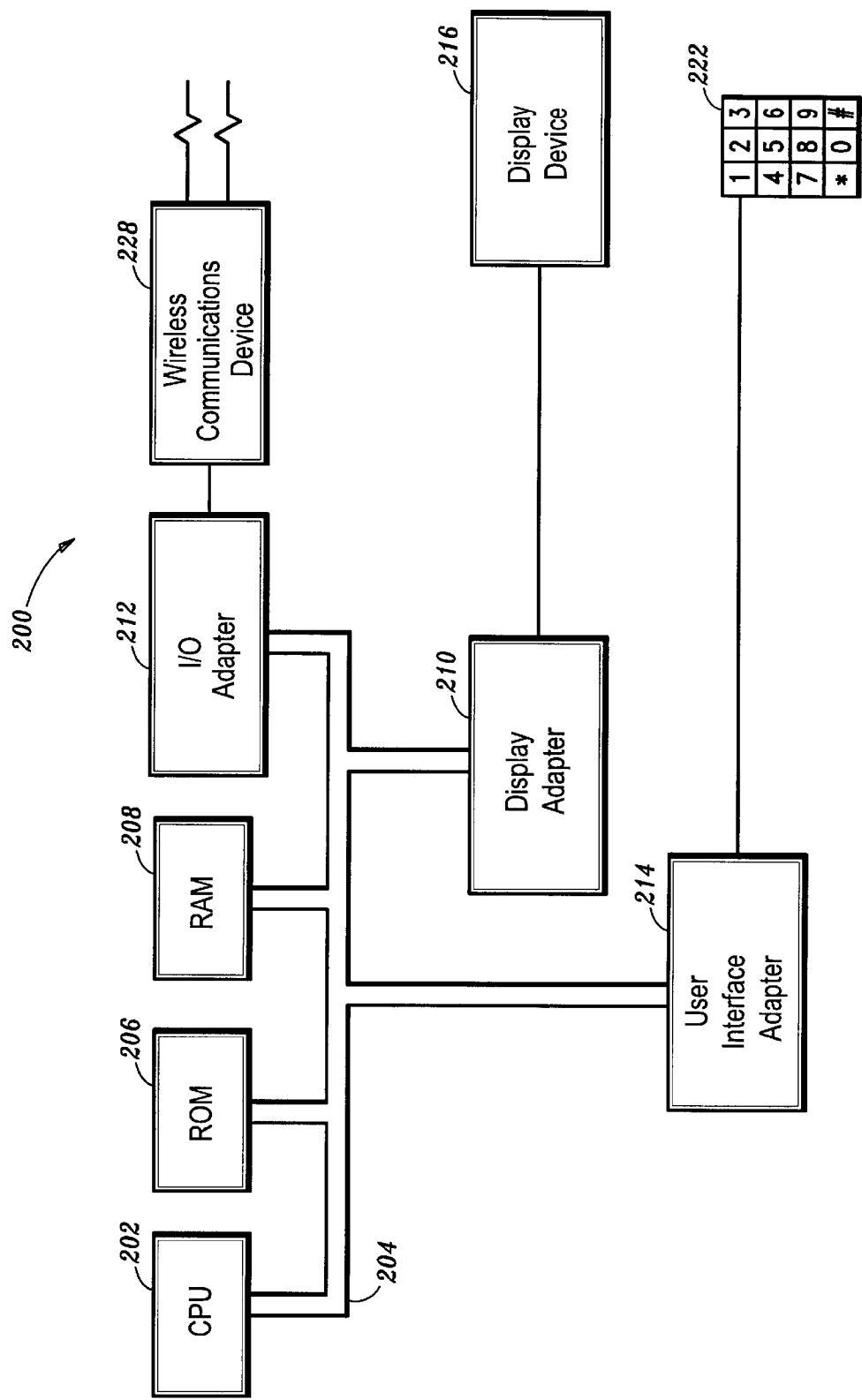
FIG. 2 shows a block diagram for a spread-spectrum hand-held communications device usable in accordance with the system of FIG. 1.

Turning to FIG. 2, a spread-spectrum communications device is generally indicated by the reference numeral 200. The communications device 200 may be embodied, for example, in a mobile cellular telephone according to embodiments of the present disclosure. The communications device 200 includes at least one processor or central processing unit ("CPU") 202 in signal communication with a system bus 204. A read only memory ("ROM") 206, a random access memory ("RAM") 208, a display adapter 210, an input/output ("I/O") adapter 212, and a user interface adapter 214 are also in signal communication with the system bus 204.

A display unit 216 is in signal communication with the system bus 204 via the display adapter 210, and a keypad 222 is in signal communication with the system bus 204 via the user interface adapter 214. The system 200 also includes a wireless communications device 228 in signal communication with the system bus 204 via the I/O adapter 212, or via other suitable means as understood by those skilled in the art.

As will be recognized by those of ordinary skill in the pertinent art based on the teachings herein, alternate embodiments of the communications device 200 are possible. For example, alternate embodiments may store some or all of the data or program code in registers located on the processor 202.

Figure 3:
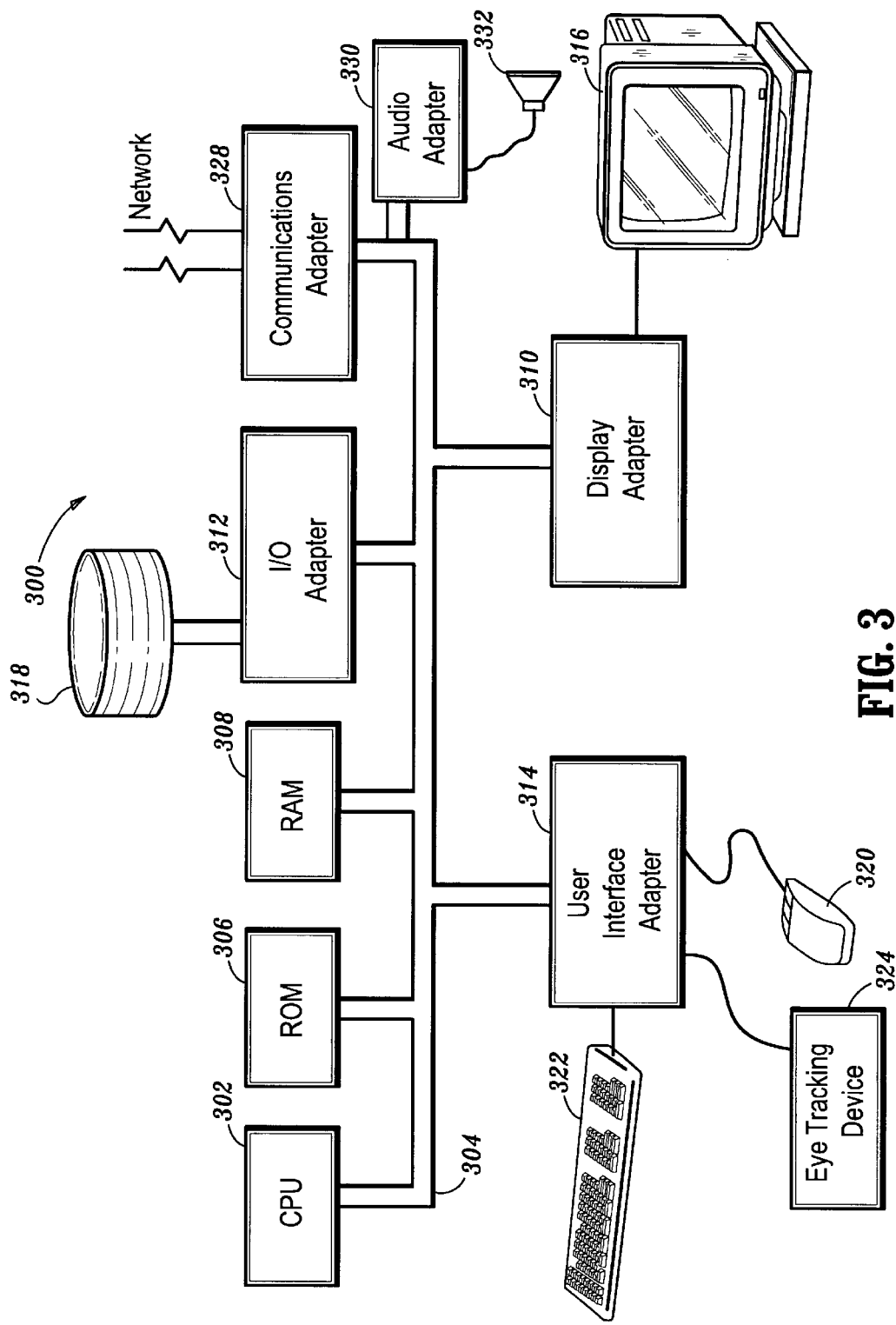
FIG. 3 shows a block diagram for a service provider computer server usable in accordance with the system of FIG. 1.

Turning now to FIG. 3, a service provider computer server is indicated generally by the reference numeral 300. The server 300 includes at least one processor or CPU 302 in signal communication with a system bus 304. A ROM 306, a RAM 308, a display adapter 310, an I/O adapter 312, and a user interface adapter 314 are also in signal communication with the system bus 304.

A display unit 316 is in signal communication with the system bus 304 via the display adapter 310. A data storage unit 318, such as, for example, a magnetic or optical disk storage unit or database, is in signal communication with the system bus 104 via the I/O adapter 312. A mouse 320, a keyboard 322, and an eye tracking device 324 are also in signal communication with the system bus 304 via the user interface adapter 314.

The system 300 also includes a communications adapter 328 in signal communication with the system bus 304, or via other suitable means as understood by those skilled in the art. The communications adapter 328 enables the exchange of data between the system 300 and a network, for example.

As will be recognized by those of ordinary skill in the pertinent art based on the teachings herein, alternate embodiments of the service provider computer server 300 are possible, such as, for example, embodying some or all of the computer program code in registers located on the processor chip 302. Given the teachings of the disclosure provided herein, those of ordinary skill in the pertinent art will contemplate various alternate configurations and implementations of elements of the server 300 while practicing within the scope and spirit of the present disclosure.

Figure 4:
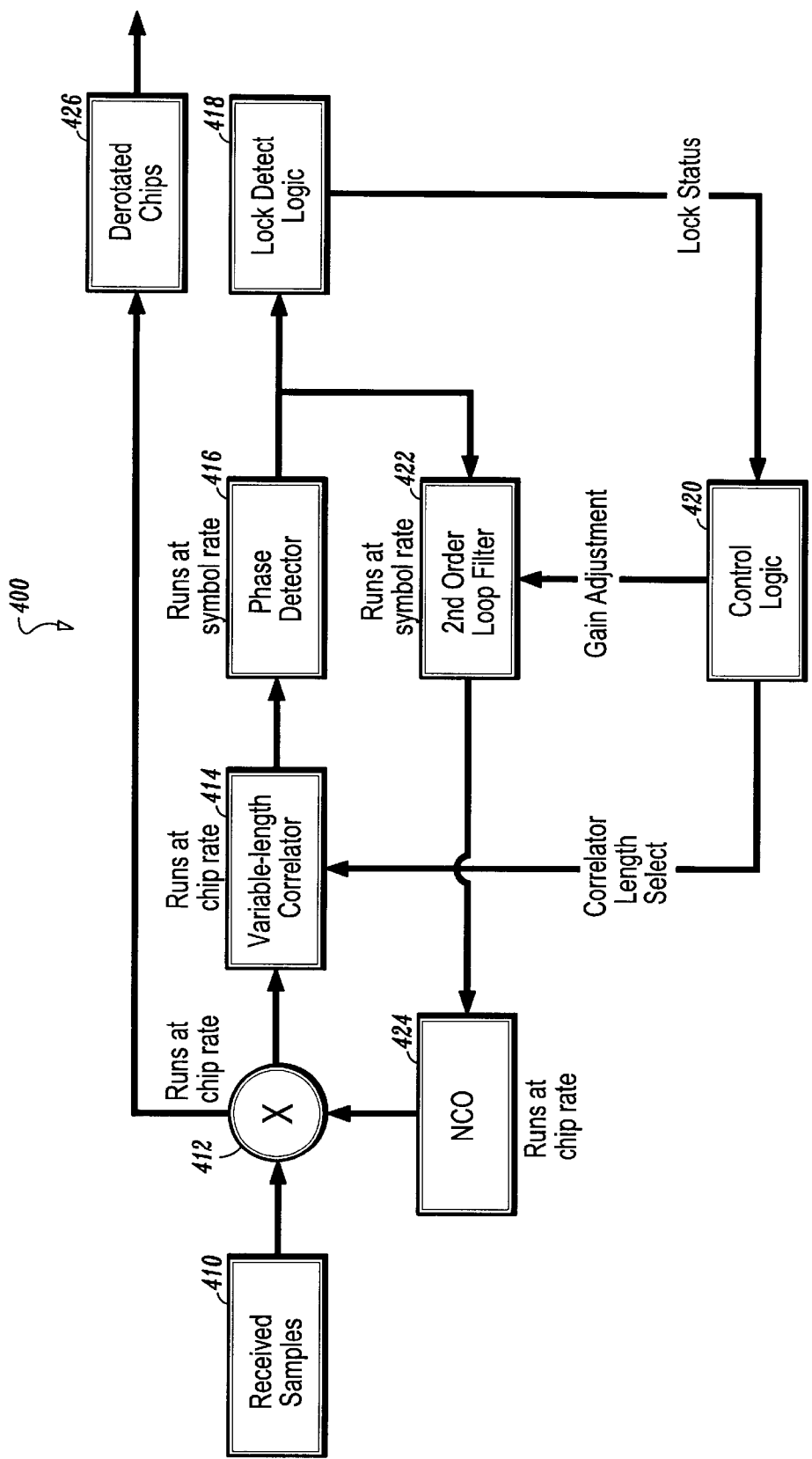
FIG. 4 shows a block diagram for a carrier recovery loop usable in accordance with the device of FIG. 2.

As shown in FIG. 4, a carrier recovery loop is generally indicated by the reference numeral 400. The carrier recovery loop 400 includes an input block 410 for receiving samples, which is coupled to a multiplier 412. The multiplier 412 runs at the signal chip rate, and feeds a variable-length correlator 414 that also runs at the chip rate. The variable-length correlator 414 feeds a phase detector 416 that runs at the symbol rate where the symbol rate is the chip rate divided by the correlator length, which detector, in turn, feeds a second-order loop filter 422 that also runs at the symbol rate.

The second-order loop filter 422 feeds a numerically controlled oscillator ("NCO") 424 that runs at the chip rate. The NCO 424 feeds a second input of the multiplier 412. The phase detector 416 also feeds a lock detector 418, which, in turn, supplies a signal indicative of lock status to a controller 420. The controller 420 supplies a signal indicative of gain adjustment to the second-order loop filter 422, and also supplies a signal indicative of correlator length selection to the variable-length correlator 414. An output of the multiplier 412 feeds a derotated chip output block 426.

Thus, advantageous features of the exemplary carrier recovery loop 400 include the variable-length correlator 414 (as opposed to the typical fixed-length correlator), the lock detector 418 and the controller 420.

In operation of the exemplary carrier recovery loop 400, the received samples come in at the chip rate and they are multiplied by the NCO 424 output, which also runs at the chip rate. Preferably, the NCO 424 is generating a complex sinusoid that has the same frequency as the signal's frequency offset. It will be the same frequency but rotating in the opposite direction in order to cancel out the effects of the frequency offset. That is, if the frequency offset is +2 kHz, the NCO should generate a sinusoid at −2 kHz which means it is spinning in the opposite direction. This multiplier 412 is called a derotator because it derotates the spinning constellation of signal chips by removing the frequency offsets.

The derotated chips are sent to the variable-length correlator 414 and, once the correlator's buffer is filled, the correlator's output is computed. This output is computed at the symbol rate where the symbol rate is the chip rate divided by the correlator length. The phase detector 416, which runs at the symbol rate, computes a phase error based on the difference between the correlator 414 output and the expected output, where the expected output is based on a training sequence in this exemplary embodiment.

The error from the phase detector 416 is filtered by a second-order proportional-plus-integral loop filter 422. The second-order loop filter can track out both frequency and phase offsets. The gains of the loop filter can be adjusted based on signals from the controller logic 420. The output of the loop filter 422, which is proportional to the frequency offset upon convergence, is used to drive the numerically controlled oscillator ("NCO").

An advantage is realized due to employment of the variable-length correlator 414 and the lock detector 418 and controller 420 logic used to determine when to change the length of the correlator 414. The Lock Detect Logic block 418 integrates the phase detector 416 output, which is preferably about zero once the loop has converged, over an observation window of a given length. The absolute value of the integrated error is then compared against two thresholds, converge_threshold and lock_threshold, where lock_threshold<converge_threshold. In addition, the Lock_status value is additionally considered. Lock_status can take on one of three possible states:

Acquiring State: In the acquiring state, the correlator length is short and the loop filter is preferably using relatively large gains to aid in quick acquisition. In this state, the carrier recovery loop is attempting acquisition and the loop filter output is preferably starting to move towards the ideal value. If the absolute value of the integrated error drops below the converge_threshold while in this state, the loop switches to the converged state.

Converged State: In the converged state the loop filter output is in the range of the ideal setting, but the short correlator length is assumed to be preventing it from locking due to a noisy loop filter output signal. The correlator length switches to long and the loop filter gains switch to a smaller setting. If the absolute value of the integrated error falls below converge_threshold while in this state, the loop switches to the locked state.

Locked State: In the locked state the correlator length stays at its long setting, but since the loop is assumed to be finally locked, the gains for the loop filter are decreased slightly to their final locked values to allow fine-tuning of the loop's frequency.

Figure 5:
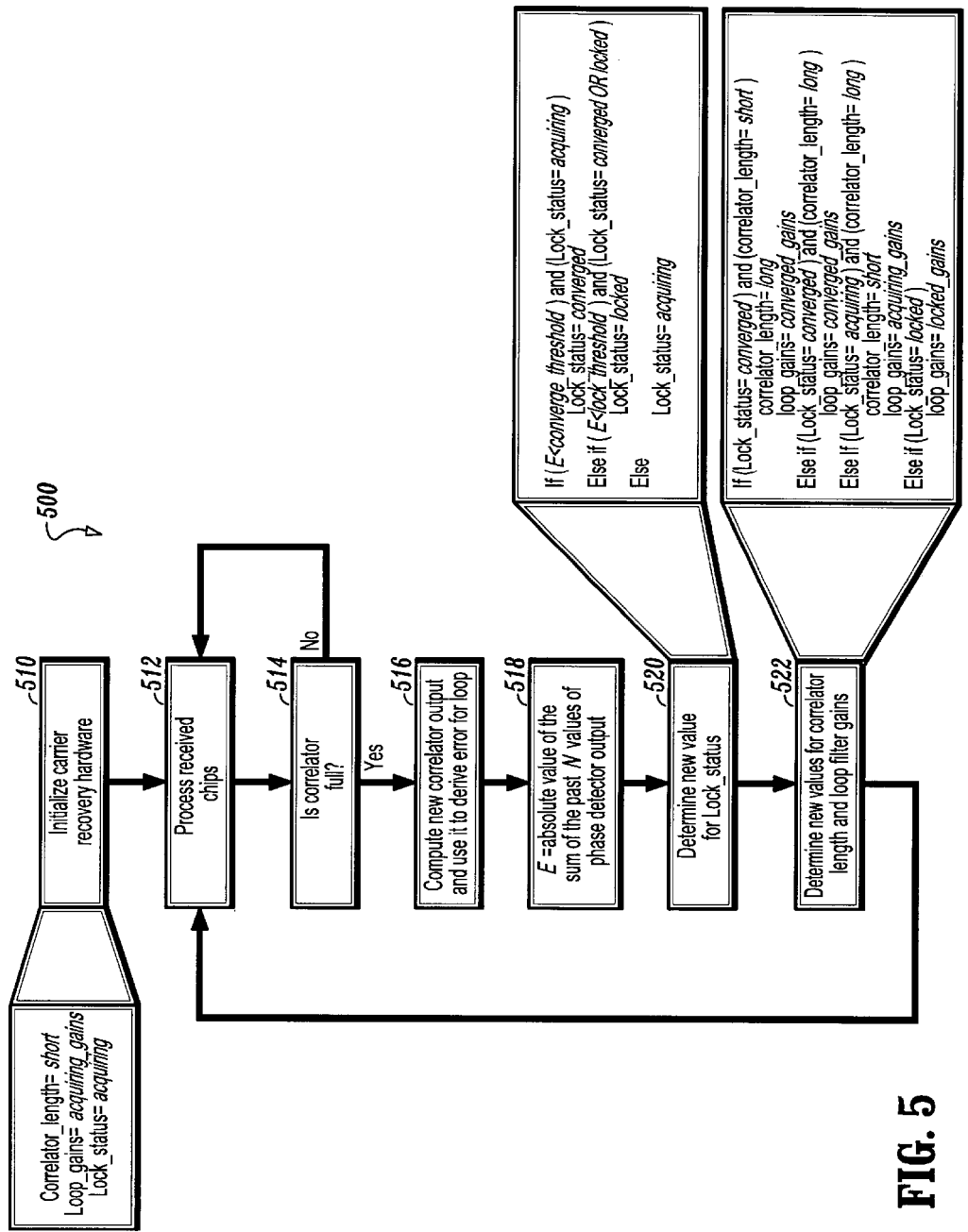
FIG. 5 shows a flow diagram for providing control logic for the carrier recovery loop of FIG. 4.

Turning to FIG. 5, a flowchart for the operation of the exemplary carrier recovery loop 400 of FIG. 4 is indicated generally by the reference numeral 500. An initialization block 510 initializes the carrier recovery hardware, including setting the correlator_length to short, the loop_gains to acquiring gains, and the lock_status to acquiring. The block 510 passes control to a function block 512 to process the received chips. The block 512 passes control to a decision block 514 to determine whether the correlator is full. If the correlator is not full, control is passed back to the function block 512. If the correlator is full, control is passed to a function block 516 to compute a new correlator output for deriving the error of the loop. The block 516 passes control to a function block 518 that sets the integrated error E to the absolute value of the sum of the past N values of the phase detector output.

The block 518 passes control to a decision block 520 to determine a new value for the lock_status. If the error E is less than the converge_threshold and the lock_status is acquiring, then the lock_status is set to converged; if not, then if the error E is less than the lock_threshold and the lock_status is either converged or locked, then the lock_status is set to locked; if not, the lock_status is set to acquiring.

The block 520 passes control to a decision block 522 to determine new values for the correlator length and loop filter gains. If the lock_status is converged and the correlator length is short, then the correlator_length is set to long and the loop_gains are set to converged_gains; if not, then if the lock_status is converged and the correlator length is long, then the loop_gains are set to converged_gains; if not, then if the lock_status is set to acquiring and the correlator_length is set to long, then the correlator_length is set to short and the loop_gains is set to acquiring gains; but if not, then if the lock_status is locked, then the loop_gains are set to the locked_gains. Upon completion, the block 522 passes control back to the block 512 for processing received chips.

Thus, if the integrated error E exceeds any of the thresholds, the logic shown of the flowchart 500 allows the length of the correlator to be switched back to the shorter length, while the gains of the loop filter are adjusted accordingly.

Figure 6:
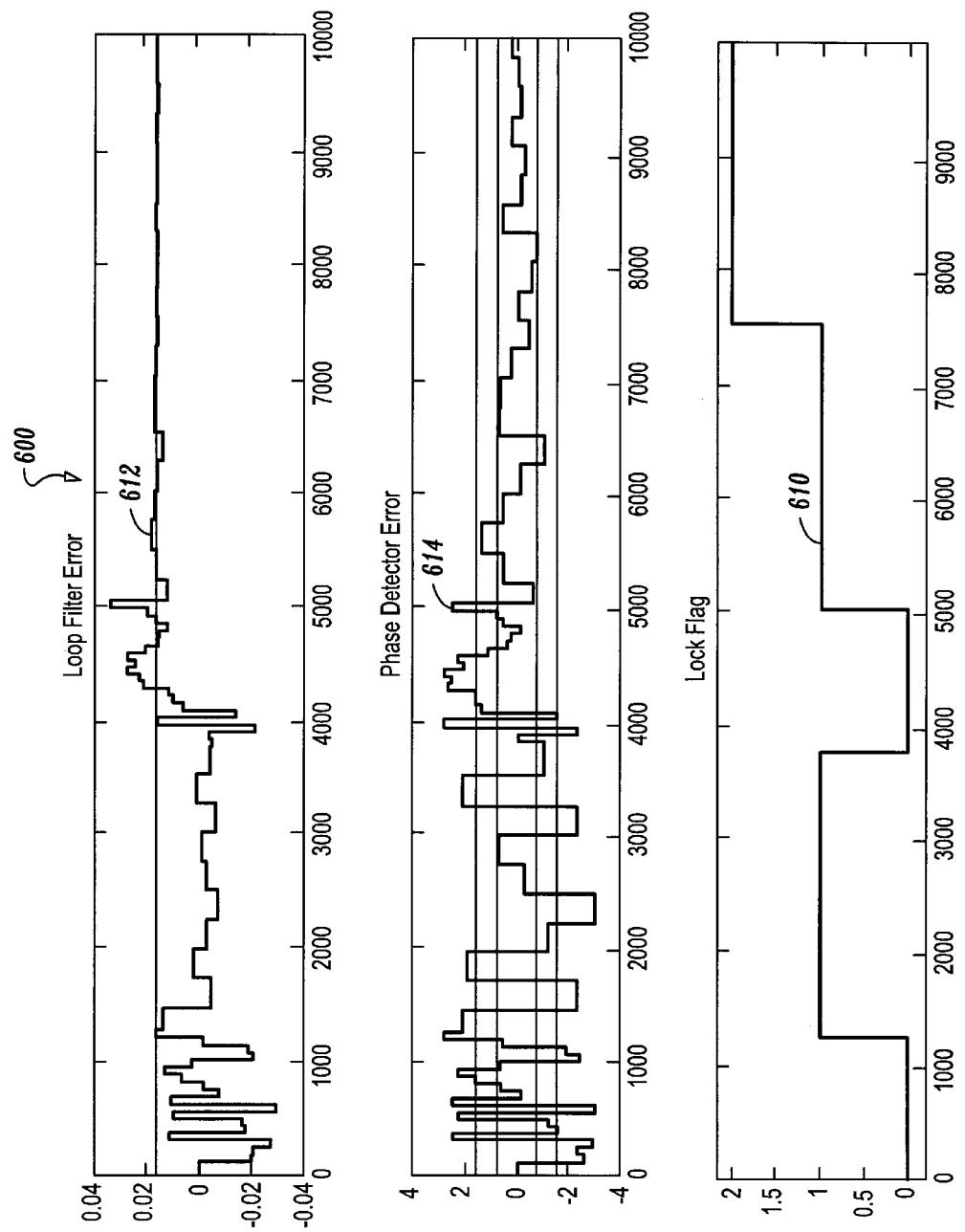
FIG. 6 shows simulation results illustrating operation of the carrier recovery loop of FIG. 4.

Turning now to FIG. 6, simulation results for the algorithm 500 of FIG. 5 as used in an exemplary wideband code division multiple access ("WCDMA") system with a signal-to-noise ratio ("SNR") of −20 dB and a frequency offset of 10 kHz are indicated generally by the reference numeral 600. A lock flag value 610 (bottom plot) of "0" indicates acquiring, while "1" indicates converged and "2" indicates locked. Here, the algorithm started out with a short correlator length of 64, and when the lock flag switched to "1", the correlator switched to a longer length of 256.

However, this first switch turned out to be premature in the exemplary simulation as the loop filter error was then too far from its ideal setting, so the logic reset the lock flag back to "0" and the loop again attempted to converge with a length 64 correlator. It was then successful, and once the lock flag was "1" the loop filter error 612 and the phase detector error 614 were near the ideal settings but still noisy. After reaching the lock condition when the lock flag was "2", the gains of the loop filter were further reduced and the loop filter output smoothed out even more. Thus, the algorithm was able to successfully track out the 10 kHz offset. When the loop was run without using the algorithm and variable-length correlator of the present disclosure, the length 256 correlator prevented the loop from acquiring at all. In fact, the loop filter output never went near the ideal setting and, instead, it oscillated around a much lower value.

Since a carrier recovery loop in a spread-spectrum system uses a correlator output in order to derive an error, the correlator is contained within the loop. The correlator output is only computed once the correlator buffer has filled up, and thus the correlator adds a delay to the loop. This delay limits the size of the frequency offset that the loop can remove (the longer the delay, the further the chips rotate between loop updates). Using a large correlator gives better resolution to the updates because of the higher processing gain, but it cannot track out large frequency offsets. Using a small correlator reduces the delay and allows larger frequency offsets to be tracked, but the carrier recovery loop will be relatively unstable due to the lower processing gain achieved with a short correlator.

In typical communications systems, frequency offsets are removed from the signal using a carrier recovery loop. In a spread-spectrum system, the error is derived from the output of a correlator that correlates the received signal (i.e., the received chips) against the known spreading sequence. Embodiments of the present disclosure employ a variable-length correlator and corresponding control logic to advantageously remove large frequency offsets that would be very difficult to remove using a fixed-length correlator.

It shall be understood by those of ordinary skill in the pertinent art that embodiments of the present disclosure can be used in any spread-spectrum system. In particular, embodiments are contemplated for use in a 3G cellular receiver that is compliant with the wideband code division multiple access ("WCDMA") and code division multiple access "cdma2000" standards.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible. Given the teachings of the disclosure provided herein, those of ordinary skill in the pertinent art will contemplate various alternate configurations and implementations of the system while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for providing variable-length correlation to track out large frequency offsets in spread-spectrum communications, the method comprising:
   receiving signal chips;
   correlating the received signal chips;
   computing a loop error in accordance with the correlation;
   setting a new lock status in accordance with the computed loop error and a previous lock status; and
   setting a new correlator length in accordance with the new lock status and a previous correlator length.

2. A method as defined in claim 1, further comprising setting new loop gains in accordance with the new lock status and the previous correlator length.

3. A method as defined in claim 1, further comprising:
   integrating a phase error;
   thresholding the absolute value of the integrated phase error; and
   selecting between one of three possible lock states in correspondence with the thresholded error.

4. A method as defined in claim 3 wherein the three possible lock states comprise acquiring, converged and locked.

5. A method as defined in claim 3 wherein each of the three possible lock states has a corresponding correlator length and set of loop filter gains.

6. A carrier recovery loop apparatus (400) for providing variable-length correlation for spread-spectrum communications, the system comprising:
   a derotator (412);
   a variable-length correlator (414) in signal communication with the derotator;
   a phase detector (416) in signal communication with the variable-length correlator;
   a lock detector (418) in signal communication with the phase detector; and
   a controller (420) in signal communication with the lock detector for controlling the length of the variable-length correlator.

7. An apparatus as defined in claim 6, further comprising:
   a loop filter (422) in signal communication with the controller for adjusting the gain of the loop filter; and
   a numerically controlled oscillator (424) in signal communication with the loop filter for providing a signal indicative of the chip rate to the derotator.

8. An apparatus as defined in claim 6, further comprising:
   a received sample buffer (410) in signal communication with the derotator; and
   a derotated chip buffer (426) in signal communication with the derotator for providing derotated chips from large frequency offsets.

9. A system for providing variable-length correlation to track out large frequency offsets in spread-spectrum communications, the system comprising:
   means for receiving signal chips;
   means for correlating the received signal chips;
   means for computing a loop error in accordance with the correlation;
   means for setting a new lock status in accordance with the computed loop error and a previous lock status; and
   means for setting a new correlator length in accordance with the new lock status and a previous correlator length.

10. A system as defined in claim 9, further comprising means for setting new loop gains in accordance with the new lock status and the previous correlator length.

11. A system as defined in claim 9, further comprising:
    means for integrating a phase error;
    means for thresholding the absolute value of the integrated phase error; and
    means for selecting between one of three possible lock states in correspondence with the thresholded error.

12. A system as defined in claim 11 wherein the three possible lock states comprise acquiring, converged and locked.

13. A system as defined in claim 11 wherein each of the three possible lock states has a corresponding correlator length and set of loop filter gains.

14. A program storage device readable by machine, tangibly embodying a program of instructions executable by the machine to perform method steps for providing a variable-length correlation to track out large frequency offsets in spread-spectrum communications, the method steps comprising:
    receiving signal chips;
    correlating the received signal chips;
    computing a loop error in accordance with the correlation;
    setting a new lock status in accordance with the computed loop error and a previous lock status; and
    setting a new correlator length in accordance with the new lock status and a previous correlator length.

15. A program storage device as defined in claim 14, the method steps further comprising setting new loop gains in accordance with the new lock status and the previous correlator length.

16. A program storage device as defined in claim 14, the method steps further comprising:
    integrating a phase error;
    thresholding the absolute value of the integrated phase error; and
    selecting between one of three possible lock states in correspondence with the thresholded error.

17. A program storage device as defined in claim 16 wherein the three possible lock states comprise acquiring, converged and locked.

18. A program storage device as defined in claim 16 wherein each of the three possible lock states has a corresponding correlator length and set of loop filter gains.

* * * * *